(12) United States Patent
Esaka et al.

(10) Patent No.: US 8,706,857 B2
(45) Date of Patent: Apr. 22, 2014

(54) INFORMATION PROCESSING APPARATUS, INFORMATION PROCESSING METHOD, DATA MANAGEMENT SERVER AND DATA SYNCHRONIZATION SYSTEM

(75) Inventors: Seiji Esaka, Tokyo (JP); Takeru Kaneko, Tokyo (JP); Masayuki Takada, Tokyo (JP); Shuhei Sonoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 12/951,983

(22) Filed: Nov. 22, 2010

(65) Prior Publication Data

US 2011/0138079 A1 Jun. 9, 2011

(30) Foreign Application Priority Data

Dec. 4, 2009 (JP) ................................. 2009-276947

(51) Int. Cl.
*G06F 15/16* (2006.01)

(52) U.S. Cl.
USPC ........... 709/223; 709/229; 709/231; 709/234; 709/235; 709/236; 709/237; 709/248; 709/249; 709/250

(58) Field of Classification Search
None
See application file for complete search history.

(56) References Cited

U.S. PATENT DOCUMENTS

| | | | | |
|---|---|---|---|---|
| 2002/0012395 A1* | 1/2002 | Song et al. | ............... | 375/240.03 |
| 2002/0080784 A1* | 6/2002 | Krumel | ............... | 370/389 |
| 2003/0233537 A1* | 12/2003 | Wohlgemuth et al. | ........ | 713/151 |
| 2005/0008163 A1* | 1/2005 | Leser et al. | .................. | 380/281 |
| 2005/0192822 A1* | 9/2005 | Hartenstein et al. | ............... | 705/1 |
| 2005/0198084 A1* | 9/2005 | Kim | ............................... | 707/204 |
| 2006/0047819 A1* | 3/2006 | Caddes et al. | ................ | 709/227 |
| 2006/0288056 A1* | 12/2006 | Yamakawa et al. | ........... | 707/203 |
| 2007/0192055 A1* | 8/2007 | Tsujino et al. | ................ | 702/150 |
| 2007/0285714 A1* | 12/2007 | Hirayama et al. | ........... | 358/1.15 |

FOREIGN PATENT DOCUMENTS

| | | | |
|---|---|---|---|
| JP | 2004-086800 | | 3/2004 |
| JP | 2004086800 A | * | 3/2004 |
| WO | WO 02/08957 A2 | | 1/2002 |

OTHER PUBLICATIONS

[No Author Listed], Syncml Sync Protocol Version 1.0. Ericsson, IBM, Matsushita Communcation Industrial Co., Ltd., Motorola, Nokia, Palm Inc., Psion, Starfish Software. Dec. 7, 2000;60 pages. http://www.syncml.org/docs/syncml_protocol_v1.0_20001207.pdf.

Floyd et al., Mobile Web Access Using eNetwork Web Express. IEEE Personal Communications. Oct. 1998;47-52.

* cited by examiner

*Primary Examiner* — Jeffrey M Rutkowski
*Assistant Examiner* — Hardikkumar Patel
(74) *Attorney, Agent, or Firm* — Wolf, Greenfield & Sacks, P.C.

(57) ABSTRACT

There is provided an information processing apparatus that is connected to a server for managing data, the information processing apparatus including a data storage configured to store the data obtained from the server, a check unit configured to check a cumulative state of change history information indicating a change type of the data in the server stored in the server, and a data obtaining unit configured to use a check result of the check unit as a basis to determine an obtaining method by selecting either a first obtaining method of synchronizing the data stored in the data storage with the data managed by the server in accordance with the change history information or a second obtaining method of obtaining, from the server, data presence information indicating the data existing in the server to synchronize the data stored in the data storage and to obtain the data from the server.

14 Claims, 10 Drawing Sheets

FIG. 3

| CHANGE TIME | DATA NAME | CHANGE TYPE | |
|---|---|---|---|
| 2009/9/11 10:24 | Test.txt | ADD | ～A |
| 2009/9/11 10:26 | Tree.jpg | UPDATE | ～B |
| 2009/9/14 13:12 | Tmp.doc | ADD | ～C |
| 2009/9/15 8:55 | cmd.log | UPDATE | ～D |
| 2009/9/15 21:07 | Test.txt | UPDATE | ～E |
| 2009/9/15 12:32 | Tree.jpg | UPDATE | ～F |
| 2009/9/16 9:21 | Tmp.doc | UPDATE | ～G |
| 2009/9/16 10:08 | cmd.log | DELETE | ～H |
| 2009/9/16 15:30 | Test.txt | UPDATE | ～I |
| 2009/9/16 18:41 | Tree.jpg | UPDATE | ～J |
| 2009/9/16 22:19 | Test.txt | DELETE | ～K |

1361 / 1362 / 1363

| DATA NAME | CHANGE TIME |
|---|---|
| 111. jpg | 2009/9/11 8:34 |
| 222. jpg | 2009/9/12 18:06 |
| 333. jpg | 2009/9/12 19:10 |
| 555. jpg | 2009/9/12 20:25 |
| 666. jpg | 2009/9/12 21:58 |

FIG. 10

| DATA NAME | CHANGE TIME | PRESENCE CHECK FLAG |
|---|---|---|
| 111. jpg | 2009/9/11 8:34 | FALSE → TRUE |
| 222. jpg | 2009/9/12 18:06 | FALSE → TRUE |
| 333. jpg | 2009/9/12 19:10 | FALSE → TRUE |
| 555. jpg | 2009/9/12 20:25 | FALSE → TRUE |
| 666. jpg | 2009/9/12 21:58 | FALSE |

| DATA NAME | CHANGE TYPE | CHANGE TYPE COMPILE |
|---|---|---|
| Test.txt | ADD → UPDATE → UPDATE → DELETE | NOTHING DONE |
| Tree.jpg | UPDATE → UPDATE → UPDATE | UPDATE |
| Tmp.doc | ADD → UPDATE | ADD |
| cmd.log | UPDATE → DELETE | DELETE |

INFORMATION PROCESSING APPARATUS, INFORMATION PROCESSING METHOD, DATA MANAGEMENT SERVER AND DATA SYNCHRONIZATION SYSTEM

BACKGROUND OF THE INVENTION

1. Field of the Invention

The present invention relates to an information processing apparatus, an information processing method, a data management server and a data synchronization system.

2. Description of the Related Art

In recent years, increase of network connecting devices and widespread use of mobile terminals allow users to access information managed on a server, no matter when or where. This accessibility requires consistent use of the information on the server for all devices managed by the users. The technique for this is synchronization. For synchronization between client/server and portable terminals, there is standardized protocol "SyncML" specified by OMA (Open Mobile Alliance), in which data flow between the server and client is regulated after check of synchronization type and client authentication. At this time, in order to specify data for synchronization, it is considered to store its change history and transmit transmission-required information to the other party based the change history.

For example, Japanese Patent Application Laid-Open No. 2004-86800 discloses a data synchronization system for automatically starting data synchronization with an appropriate amount of transmitted data based on data update history so as not to transmit or receive a large amount of information in one data synchronization. With this system, it is possible to reduce the possibility of occurrence of errors in data synchronization and increase of communication time, reduce communication cost and prevent exclusive use of a client terminal by a data synchronization program.

SUMMARY OF THE INVENTION

However, in the data synchronization system in Japanese Patent Application Laid-Open No. 2004-86800, if the client terminal does not respond to a data synchronization start request, or for example, when a part of plural client terminals is completely switched off, the number of history records exceeds a threshold of storable record amount and the information amount transmitted and received when starting synchronization becomes enormous. In this case, as the memory use amount is increased with increase in history records, the burden or load of the server storing the history records increases.

In light of the foregoing, it is desirable to provide a novel and improved information processing apparatus, information processing method, data management server and data synchronization system capable of reducing server load and processing time.

According to an embodiment of the present invention, there is provided an information processing apparatus that is connected to a server for managing data via a network, the information processing apparatus including a data storage configured to store the data obtained from the server, a check unit configured to check a cumulative state of change history information indicating a change type of the data in the server stored in the server, and a data obtaining unit configured to use a check result of the check unit as a basis to determine an obtaining method by selecting either a first obtaining method of synchronizing the data stored in the data storage with the data managed by the server in accordance with the change history information or a second obtaining method of obtaining, from the server, data presence information indicating the data existing in the server to synchronize the data stored in the data storage and to obtain the data from the server.

Here, the check unit may check whether the number of pieces of the change history information stored in the server exceeds a predetermined history number, the data obtaining unit may obtain the data by the first obtaining method when the number of pieces of the change history information stored in the server is equal to or less than the predetermined history number, and the data obtaining unit may obtain the data by the second obtaining method when the number of pieces of the change history information stored in the server exceeds the predetermined history number.

Moreover, the data storage may store client data information that is information relating to the data stored in the data storage, and when obtaining the data by the second obtaining method, the data obtaining unit may compare the data presence information with the client data information and obtains from the server only data updated at the server.

Furthermore, when obtaining the data by the second obtaining method, the data obtaining unit may compare the data presence information with the client data information to specify data that exists only in the information processing apparatus, and deletes the data that exists only in the information processing apparatus from the data storage.

Moreover, the data obtaining unit may transmit to the server information for updating the data managed by the server in synchronization with data changed in the information processing apparatus based on transmission state information that indicates the data changed in the information processing apparatus and not transmitted to the server, and contained in the client data information.

Furthermore, the data obtaining unit may compile the change history information on a data basis and obtains the data from the server based on the change history information compiled.

Moreover, the data obtaining unit may divide the change history information arranged in chronological order, into a predetermined number of data pieces and may obtain the data from the server per divided piece of the change history information.

According to another embodiment of the present invention, there is provided an information processing method, including the steps of checking a cumulative state of change history information that is stored in a server connected via a network for managing the data and indicates a change type of the data in the server, using a check result of the cumulative state of the change history information as a basis to determine an obtaining method by selecting either a first obtaining method of synchronizing the data stored in a data storage for storing the data obtained from the server with the data managed by the server in accordance with the change history information or a second obtaining method of obtaining, from the server, data presence information indicating the data existing in the server to synchronize the data stored in the data storage, and obtaining the data from the server by the obtaining method determined.

According to another embodiment of the present invention, there is provided a data management server including a data storage configured to store data, a data change unit configured to change the data stored in the data storage based on change information, a server history storage configured to store change history information indicating a change type of the data changed by the data change unit, a setting storage configured to store an upper limit of cumulative amount of the change history information stored in the server history storage, a managing unit configured to manage a cumulative amount of the change history information stored in the server history storage based on the upper limit of cumulative amount, an information processing unit configured to, upon request from a client connected via a network, obtain the change history information or the data to transmit to the client and create data presence information indicating the data existing in the data storage based on the data stored in the data storage, and a server communication unit configured to transmit to the client the data presence information created, the change history information or the data obtained by the information processing unit.

The managing unit may stop accumulation of the change history information when the cumulative amount of the change history information stored in the server history storage exceeds the upper limit of cumulative amount.

Moreover, when the cumulative amount of the change history information stored in the server history storage exceeds the upper limit of cumulative amount, the managing unit may record, in the data history storage, overflow determination information indicating that the cumulative amount of the change history information exceeds the upper limit of cumulative amount.

Furthermore, the information processing unit may include a first processing unit for obtaining the data from the data storage and creating the server presence information and a second processing unit for obtaining the change history information from the server history storage, and when receiving a transmission request of the change history information from the client, the server communication unit may cause the second processing unit to obtain the change history information from the server history storage.

Moreover, the server history storage may store the change history information per client connected via the network.

According to another embodiment of the present invention, there is provided an information processing method, including the steps of changing data stored in a data storage for storing the data, based on change information, storing in a server history storage change history information indicating a change type of the data changed, managing a cumulative amount of the change history information stored in the server history storage based on an upper limit of cumulative amount of the change history information stored in the server history storage, upon request from a client connected via a network, obtaining the data or the change history information to transmit to the client, upon request from the client, creating data presence information indicating the data existing in the data storage based on the data stored in the data storage, and transmitting the data obtained, the change history information or the data presence information created to the client.

According to another embodiment of the present invention, there is provided a data synchronization system for synchronization of data between a client and a server connected via a network. The server including a data storage configured to store the data, a data change unit configured to change the data stored in the data storage based on change information, a server history storage configured to store change history information indicating a change type of the data changed by the data change unit, a setting storage configured to store an upper limit of cumulative amount of the change history information stored in the server history storage, a managing unit configured to manage a cumulative amount of the change history information stored in the server history storage based on the upper limit of cumulative amount, an information processing unit configured to, upon request from the client connected via the network, obtain the change history information or the data to transmit to the client and create data presence information indicating the data existing in the data storage based on the data stored in the data storage, and a server communication unit configured to transmit to the client the data presence information created, the change history information or the data obtained by the information processing unit. The client including a client communication unit configured to receive the data, the change history information and the data presence information from the server, a data storage configured to store the data obtained from the server, a check unit configured to check a cumulative state of the change history information stored in the server, and a data obtaining unit configured to use a check result of the check unit as a basis to determine an obtaining method by selecting either a first obtaining method of synchronizing the data stored in the data storage with the data managed by the server in accordance with the change history information or a second obtaining method of obtaining, from the server, data presence information indicating the data existing in the server to synchronize the data stored in the data storage, and to obtain the data from the server.

As mentioned above, according to the invention, it is possible to provide an information processing apparatus, an information processing method, a data management server and a data synchronization system capable of reducing the server load and processing time.

BRIEF DESCRIPTION OF THE DRAWINGS

FIG. 3 is an explanatory view illustrating a configuration of a history information file;

FIG. 10 is an explanatory view for explaining the data delete processing in the processing of FIG. 9;

DETAILED DESCRIPTION OF THE EMBODIMENT

Figure 1:
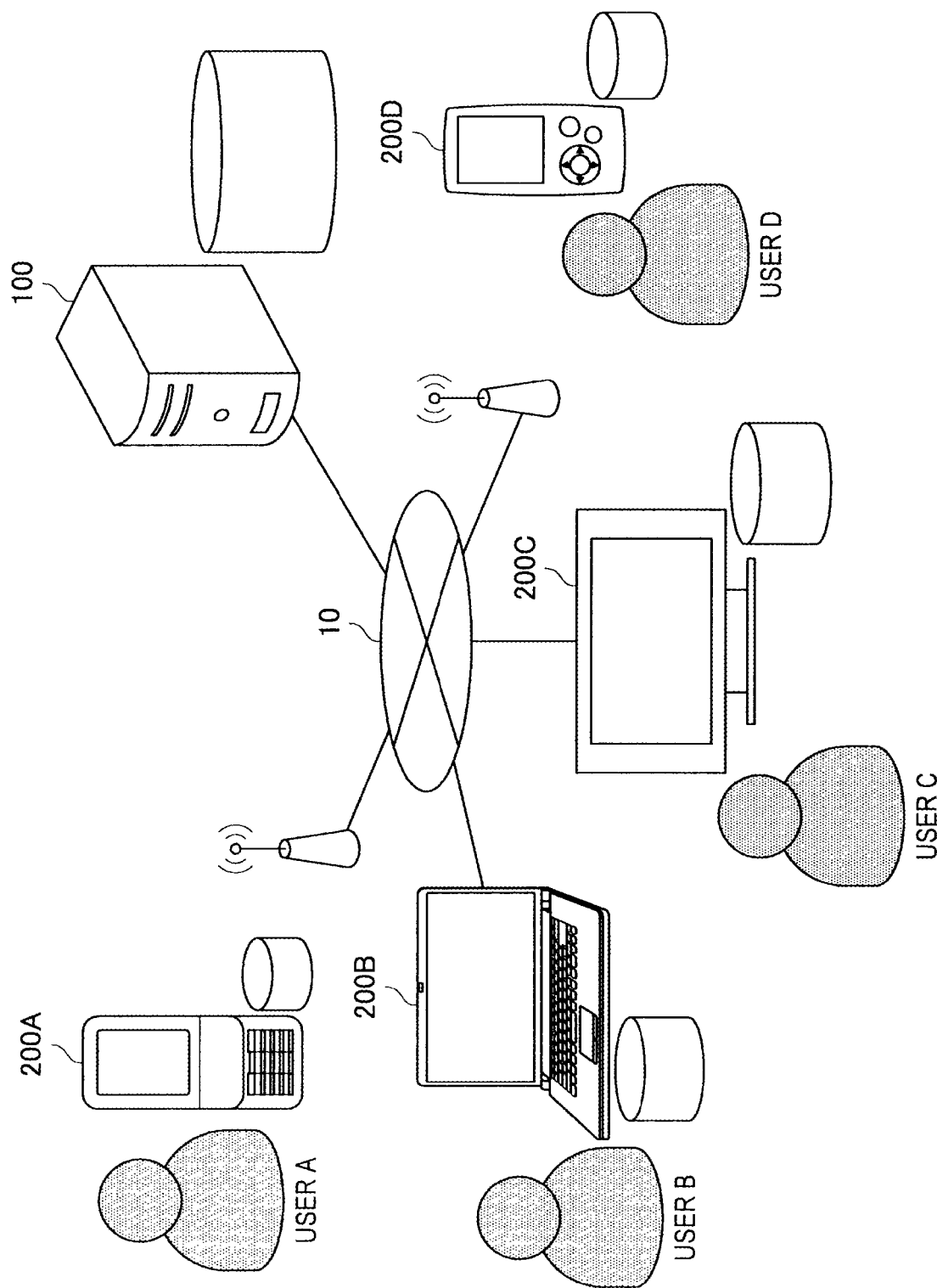
FIG. 1 is a conceptual view schematically illustrating a configuration of a data synchronization system according to an embodiment of the invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.

1. Example of configuration of data synchronization system
2. Configuration of data synchronization system
3. Data synchronization processing
  3-1. Data synchronization processing in the case of no overflow
  3-2. Data synchronization processing in the case of overflow
4. Effective processing method of information of history of changes
  4-1. Compiling of information of history of changes
  4-2. Division of information of history of changes

[1. Example of Configuration of Data Synchronization System]

An outline of the configuration of the data synchronization system according to an embodiment of the invention will be described first with reference to FIG. 1. FIG. 1 is a conceptual view schematically illustrating a configuration of a data synchronization system according to an embodiment of the invention.

The data synchronization system of this embodiment is configured to have a server 100 for providing data; and one or a plurality of clients 200 capable of obtaining data from the server 100, the server 100 and the clients 200 being connected via a network 10. For example, as illustrated in FIG. 1, the data synchronization system may be configured of the server 100 and four clients 200A, 200B, 200C and 200D connected thereto. Communication between the server 100 and clients 200 may be radio communication or wire communication. Data transmitted and received between the server 100 and clients 200 may be, for example, still images such as pictures, moving images, document files, mails and application data such as calendar.

The server 100 holds data and provides the data upon request from the client 200. The server 100 manages a history of changes of the data and provides the client 200 with a history information file used in the data synchronization processing. The client 200 is an information processing terminal capable of obtaining desired data from the server 100, and may be a communication terminal such as a cell phone or a PDA (Personal Digital Assistants), a computer, a television receiver or the like. Each client 200 is able to refer to and modify data obtained from the server 100, and also able to delete and add data.

In the data synchronization system according to the present embodiment, synchronization processing is performed so that each of the clients 200 can obtain the data held by the server 100 in the same state. For example, as illustrated in FIG. 1, when users A to D of the clients 200A to 200D connected via the network 10 are different, data that is desired to be shared between the users is synchronized in the latest state so that the users are prevented from using different data. When the users of the clients 200A to 200D are the same, data needs to be synchronized in order for any client 200 to obtain data it holds and manages at the latest state, no matter when or where.

All of the clients 200 copy all or a part of the data managed by the server 100 in their own database or memory. Then, when there is a change in the data stored in the server 100, the client 200 obtains the change information and incorporates the change thereby to maintain synchronous state. Besides, when there is a change in the data held at the client 200, the client 200 transmits the change information to the server 100 to cause the server 100 to execute necessary processing. The following description is made about the structure of the data synchronization system of the present embodiment capable of reducing the server load and processing time and the data synchronization processing in the system.

[2. Configuration of Data Synchronization System]

Figure 2:
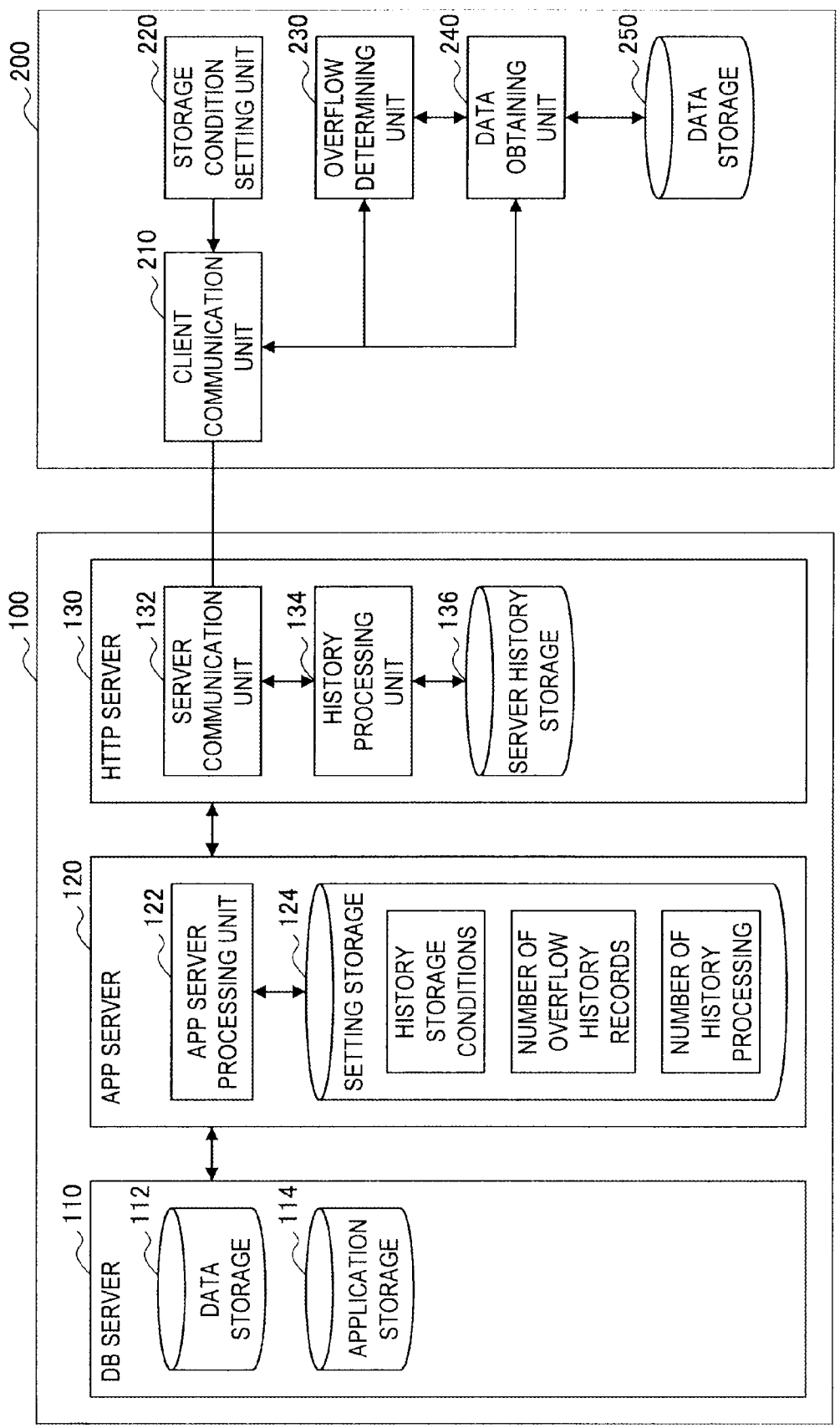
FIG. 2 is a block diagram illustrating the functional structure of the data synchronization system of the embodiment.

First, with reference to FIGS. 2 and 3, the structure of the data synchronization system of the present embodiment is explained. FIG. 2 is a block diagram illustrating the functional configuration of the data synchronization system of the present embodiment and FIG. 3 is an explanatory view illustrating one configuration of a history information file.

The server 100 of the data synchronization system of the present embodiment includes, as illustrated in FIG. 2, a database server (hereinafter referred to as "DB server") 110, an application server (hereinafter referred to as "APP server") 120 and an HTTP server 130. The DB server 110, APP server 120 and HTTP server 130 may be separate from each other or any two or more of them may be combined into one unit.

The DB server 110 is a server for holding and managing data. The DB server 110 of the present embodiment stores all data including information of a data main body, meta information and application data. For example, the data main body information and metal information are stored in a data storage 112 of the DB server 110 and the application data is stored in an application storage 114, that is, the data is stored in a predetermined storage of the DB server 110. The DB server 110 has a data change unit (not shown) for changing data stored in the storage based on instruction information from the APP server 120 and an output unit (not shown) for outputting the data to the APP serer 120.

The APP server 120 acts to mediate change of data between the DB server 110 and the HTTP server 130 upon request from the client and monitor the data stored in the DB server 110 to output data information indicating a state of data to the HTTP server 130. For example, the APP server 120 includes, as illustrated in FIG. 2, an APP server processing unit 122 and a setting storage 124.

The APP server processing unit 122 acts to mediate processing of data between the DB server 110 and the HTTP server 130 and also acts as an information processing unit for obtaining data information and the like based on setting information. The APP server processing unit 122 outputs change history information of data stored in the DB server 110 to the HTTP server 130 and stores it in a server history storage 136. Besides, the APP server processing unit 122 acts as a managing unit to determine whether or not there is an overflow in the change history information of data managed at the server 100, and notify the HTTP server 130 of its determination result (overflow determination information). The setting storage 124 stores, for example, history storage conditions and setting information such as the number of overflow history records and the number of history processing. This setting information will be described later.

Further, the APP server processing unit 122, upon request from the client 200, creates data presence information including data name and last change time of the data for every data stored in the data storage 112 of the DB server 110. The data presence information is created every time transmission is requested from the client 200. The client 200 obtains the data presence information thereby to recognize a latest state of the data managed in the data storage 112.

The HTTP server 130 is a server for communicating with the client 200. The HTTP server 130 includes, for example, a server communication unit 132, a history processing unit 134 and a server history storage 136. The server communication unit 132 is an interface for communicating with the client 200. The server communication unit 132 obtains information from the client 200, outputs it to the DB server 110 via the APP server 120, and obtains data from the DB server 110 and transmits it to the client 200 via the APP server 120. Further, the server communication unit 132 outputs data information indicating a state of data in the DB server 110 to a history processing unit 134.

The history processing unit 134 uses the data information to store, in the server history storage 136, change history information for managing a change of data stored in the DB server 110. The history processing unit 134 stores, in the server history storage 136, a data name contained in the data information, change time of the data and change type as change history information. Further, the history processing unit 134 acts as an information processing unit for obtaining a history information file containing the change history information upon request from the client 200, and transmits it to the client 200 via the server communication unit 132.

The server history storage 136 stores the history information file including change history information of data and the like. The server history storage 136 writes therein change information of data transmitted from the APP server processing unit 122 every time the data stored in the data storage 112 of the DB server 110 is changed. The change history information contained in the history information file of the server history storage 136 includes, for example, as illustrated in FIG. 3, a change time 1361, a data name 1362 and a change type 1363 to be managed. In the change type 1363, for example, data are stored as "add" that indicates newly added data to the DB server 110, "update" that indicates updated data of the already stored data, "delete" that indicates deleted data of the stored data, and the like.

Besides, the history information file contains overflow determination information that indicates whether or not the number of change history information pieces exceeds a history number stored in the server history storage 136 (number of overflow history records) or there is an overflow. The number of overflow history records can be set to such a value that load on the server 100 and client 200 does not become heavy in accordance with the performance of the server 100 and client 200. The server history storage 136 manages history information files per client 200.

The server 100 of this embodiment manages history information files each containing overflow determination information and change history information indicating a change type of data in the server 100 at the HTTP server 130 in charge of communication with the client 200. This makes it possible to reply promptly to request of transmission of a history information file from the client 200 thereby to reduce the load on the server 100.

Next, the client 200 includes, as illustrated in FIG. 2, a client communication unit 210, a storage condition setting unit 220, an overflow determining unit 230, a data obtaining unit 240 and a data storage 250.

The client communication unit 210 is an interface for communication with the server 100. The client communication unit 210 transmits history storage conditions set by the storage condition setting unit 220, transmission request of data, data presence information and change history information to the server 100 and receives from the server 100 the change history information, the data presence information and the data. The client communication unit 210 outputs received change history information, data presence information and data to the overflow determining unit 230 and data obtaining unit 240.

The storage condition setting unit 220 sets setting information for storing change history information in the server 100 based on the specifications of the client 200, input information input from a user and the like. The setting information includes, for example, monitoring conditions compatible with the client 200 (for example, designation conditions of a synchronization folder for synchronizing all data in the server 100 for a client 200 having a large capacity memory and synchronizing a part of data for a client 200 having a small memory). In addition, setting information may be of conditions for restricting type of data for storing change history information. The storage condition setting unit 220 outputs setting information to the server 100 via the client communication unit 210.

The overflow determining unit 230 refers to the overflow determination information of the history information file to check if it exceeds the cumulative amount of change history information of data to be stored at the sever 100 side. If the change history information to be managed at the server 100 becomes huge, the data amount of the history information files to be managed at the HTTP server 130 increases and the use amount of memory may be increased remarkably. Besides, it is thought that there is a threshold for the number of history records by which the time taken for the history information processing becomes longer than the time of copying all the data managed by the server 100 to the client 200 side. In this embodiment, the history information processing based on the change history information is transited to the data copying processing based on the data presence information in the vicinity of this threshold thereby to reduce the server load and shorten the synchronization time. That is, the overflow determination information is information indicating that the history information processing is transited to the data copying processing.

The overflow determination information of the server 100 is managed at the client 200 as an overflow flag. For example, when it is confirmed that the number of history records managed in the history information file of the overflow determination information does not exceed the number of overflow history records, the overflow flag is "false". Besides, when it is confirmed that the number of history records managed in the history information file of the overflow determination information exceeds the number of overflow history records, the overflow flag is "true". That is, the number of overflow history records is the above-mentioned threshold and the overflow flag set at the client 200 and the overflow determination information receive from the APP server processing unit 122 of the server 100 become information indicating the state of the number of change history information pieces of the server 100 with respect to the above-mentioned threshold. In this way, the overflow determining unit 230 refers to the overflow determination information of the obtained history information file to check if there is an overflow at the server 100 side and outputs a check result (overflow flag) to the data obtaining unit 240.

The data obtaining unit 240 determines a data obtaining method from the server 100 based on a check result of the overflow determining unit 230, and obtains the data from the server 100. The data obtaining unit 240 determines which of the history information processing (first obtaining method) and the data copying processing (second obtaining method) is executed, from the check result of the overflow occurrence at the server 100 side. Then, the data obtaining unit 240 uses the determined obtaining method as a basis to request the server 100 to provide the data via the client communication unit 210. The data provided from the server 100 upon such a request is output from the client communication unit 210 to the data obtaining unit 240 to be stored in the data storage 250.

In obtaining data from the server 100, the data obtaining unit 240 obtains, via the client communication unit 210, the data presence information created by the APP server processing unit 122 or the history information file stored in the server history storage 136 of the HTTP server 130. Further, the data obtaining unit 240 uses the data obtained from the server 100 as a basis to create and update the client data information that is information relating to the data stored in the client 200. The client data information is updated by the data obtaining unit 240 also when the processing such as addition, change and deletion of the data is performed at the client 200 side. Here, contents of the client data information will be described later.

The data storage 250 stores data obtained from the server 100 by the data obtaining unit 240. A user of the client 200 can perform processing of referring to, updating, adding, and deleting the data stored in the data storage 250. The data storage 250 stores information relating to the data stored in the data storage 250 as client data information. The client data information contains a data name, a last change time at the server 100, a storage time when the data is stored in the data storage 250 and a transmission state flag indicating whether or not the data is transmitted from the client 200 to the server 100. Besides, the client data information may contain a presence check flag indicating whether the data stored in the client 200 is data present in the server 100 or not. The presence check flag may be used when deleting the data in the data copying processing. The processing will be described in detail below. The client data information is updated every time the state of data stored in the data storage 250 is changed.

The functional structure of the data synchronization system according to the present embodiment has been described up to this point.

[3. Data Synchronization Processing]

Figure 4:
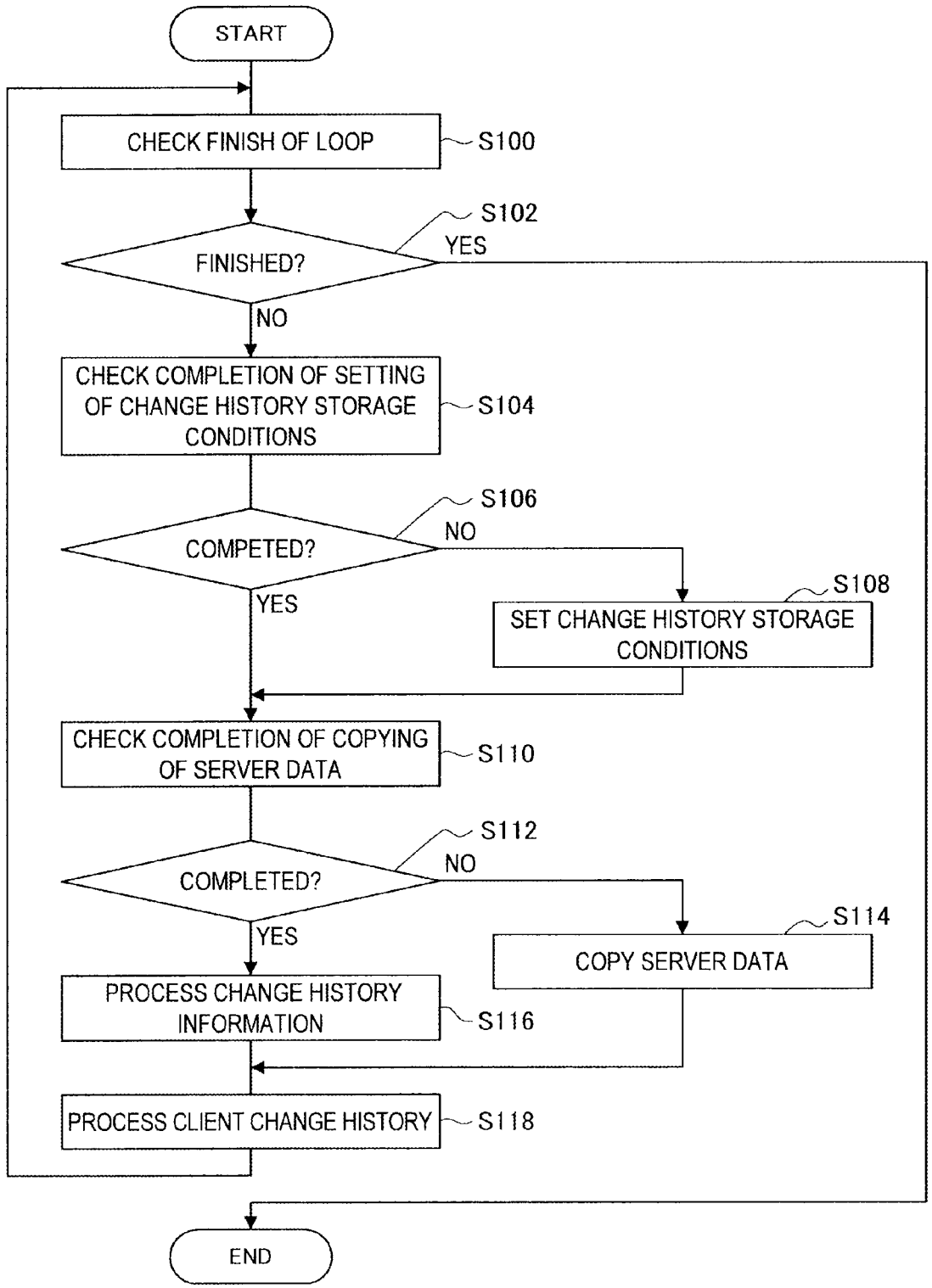
FIG. 4 is a flowchart illustrating data synchronization processing in a client when there is no overflow in a server.
Figure 5:
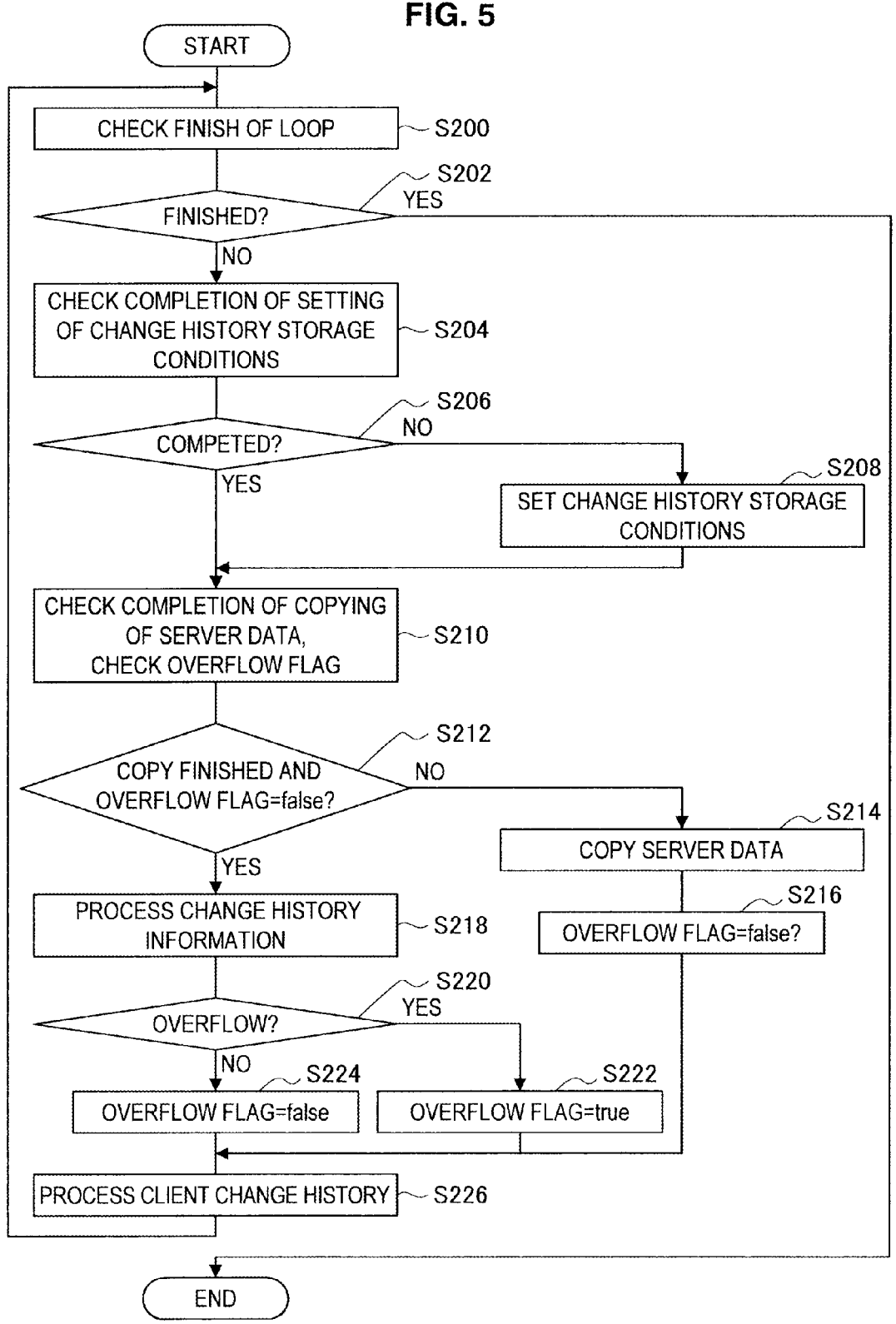
FIG. 5 is a flowchart illustrating data synchronization processing in the client when there is an overflow in the server.
Figure 6:
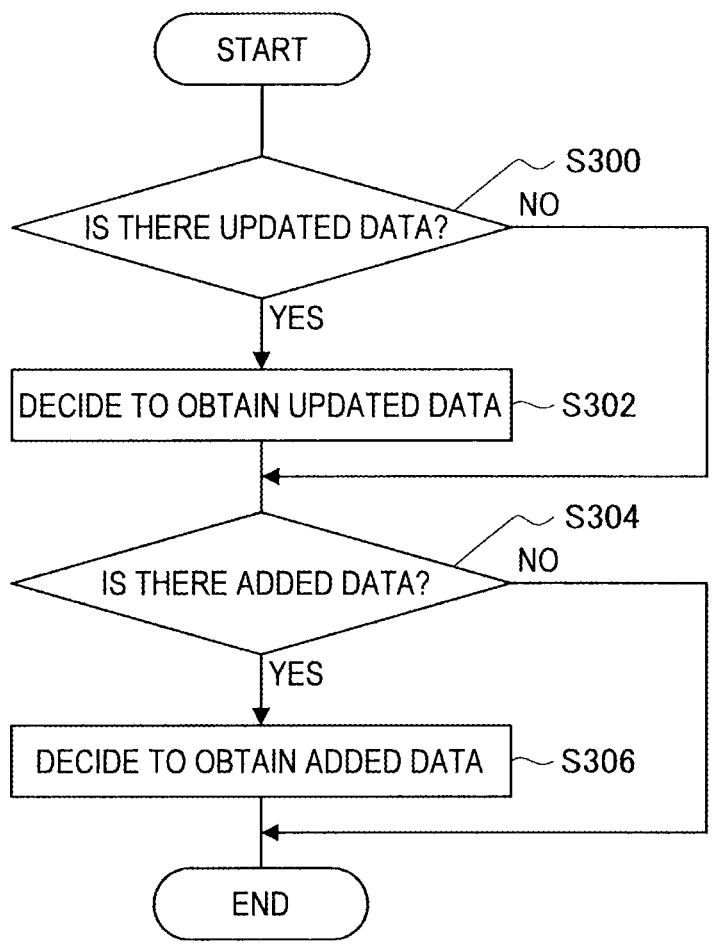
FIG. 6 is a flowchart illustrating data update and add processing in the client when there is an overflow in the server.
Figures 7, 8:
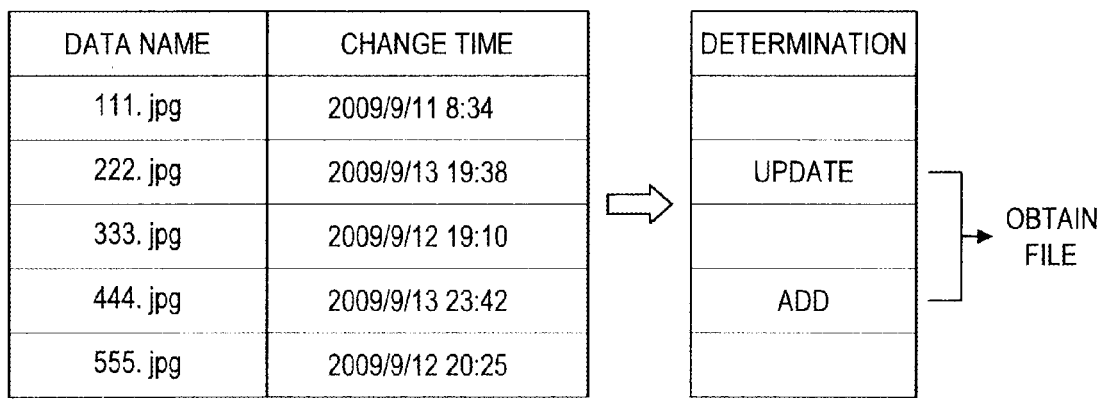
FIG. 7 is an explanatory view illustrating an example of data information managed by the client.
FIG. 8 is an explanatory view for explaining the data update and add processing in the processing of FIG. 6.
Figure 9:
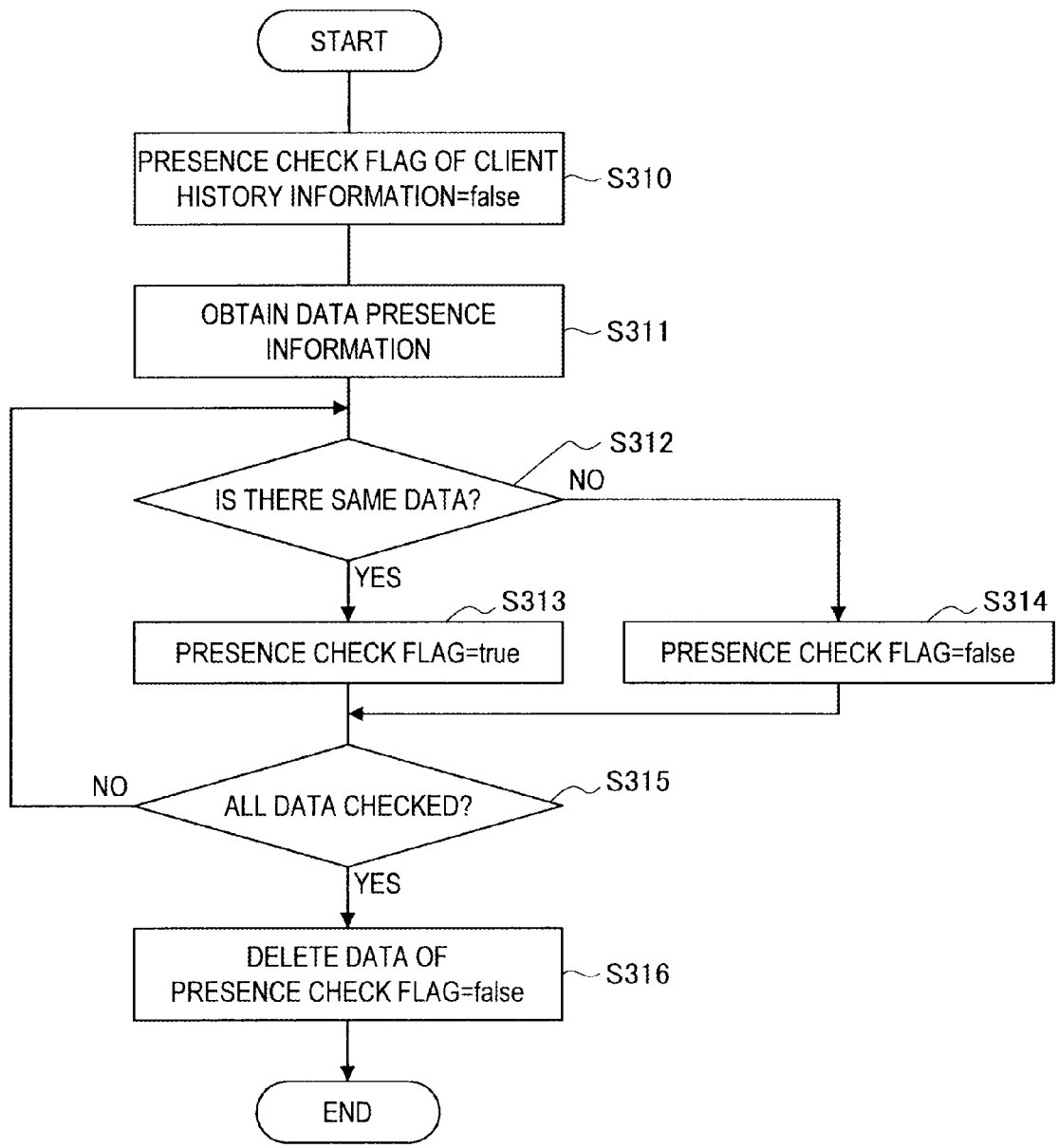
FIG. 9 is a flowchart illustrating data delete processing at the client when there is an overflow in the server.

Next, the data synchronization processing in the data synchronization system according to the present embodiment will be described with reference to FIGS. 4 to 10. FIG. 4 is a flowchart illustrating data synchronization processing in a client 200 when there is no overflow in the server 100. FIG. 5 is a flowchart illustrating data synchronization processing in the client 200 when there is an overflow in the server 100. FIG. 6 is a flowchart illustrating data update and add processing in the client 200 when there is an overflow in the server 100. FIG. 7 is an explanatory view illustrating an example of data information managed at the client 200. FIG. 8 is an explanatory view for explaining the data update and add processing in the processing of FIG. 6. FIG. 9 is a flowchart illustrating data delete processing at the client 200 when there is an overflow at the server 100. FIG. 10 is an explanatory view for explaining the data delete processing in the processing of FIG. 9.

In the data synchronization system of the present embodiment, the data obtaining method is different depending on whether or not there is an overflow in the information of a history of changes managed by the server 100. The following description treats the data synchronization processing in detail in both cases when there is an overflow and no overflow.

(3-1. Data Synchronization Processing in the Case of No Overflow)

The data synchronization processing when there is no overflow is performed following the flowchart illustrated in FIG. 4. The client 200 monitors the state of the server 100 on a regular basis and determines if finish conditions to finish the data synchronization processing are satisfied (step S100). The finish conditions may be, for example, such that the client 200 and the server 100 are disconnected or the like. The client 200 determines whether or not the finish conditions are met (step S102). When the finish conditions are met, the data synchronization processing is finished. On the other hand, if the finish conditions are not met, it is determines if the setting of history storage conditions is completed (step S104).

The history storage conditions are information to be stored in the server 100 and set per client 200 in such a manner that the data synchronization is performed at the conditions suitable for the client 200 in accordance with the specifications of the client 200. The history storage conditions include, for example, synchronization folder designating conditions such that all data in the server are synchronized for clients 200 having a large capacity memory and a part of the data is synchronized for clients 200 each having only a small memory, and setting information of conditions for restricting data type. Besides, the history storage conditions may include designation of a change type of a history to store (for example, "add", "update", "delete" etc.).

The client 200 determines whether or not setting of the above-mentioned setting information is performed by the storage condition setting unit 220 (step S106). If the setting information is not set, the client 200 performs setting of the setting information and outputs it as history storage conditions to the server 100 via the client communication unit 210 (step S108). Then, after the history storage conditions are set at step S108 or when the history storage conditions are already set, the client 200 determines whether or not data managed by the server 100 is copies from the server 100 to the client 200 (step S110).

Copying of data managed by the server 100 is processing to be executed when the client 200 is first connected to the server 100. In a system where data synchronization processing is performed frequently, once the processing is executed, such processing is hardly performed again. The processing is executed again, for example, when there is an overflow in the number of change history information pieces to be managed at the server 100, or when there is large amount of data to copy, the data is divided into plural pieces and transmitted to the client 200 separately and all pieces of the data are not received completely. Here, the processing when copying of the data is executed again will be described later. In S110, in fact, like S210 of FIG. 5 described later, it is checked with reference to an overflow flag whether there is an overflow of change history information at the server 100. However, in the case described here, there is no overflow and such processing is omitted from description.

The client 200 determines whether or not copying of the data from the server 100 to the client 200 is finished (step S112), and if not finished, copying of the data managed at the server 100 is performed (step S114; Data copying). The processing of S114 starts with a request from the client 200 to the server 100 for information of all data present in the server 100, that is, data present information. When receiving such a request, the HTTP server 130 notifies the APP server processing unit 122 of the APP server 120 of the request. The APP server processing unit 122 refers to the data storage 112 to obtain data names and last change times of all data pieces stored in the data storage 112 and creates server presence information. The APP server processing unit 122 transmits the created server presence information to the client 200 via the HTTP server 130. Then, the client 200 compares the data presence information with client data information and specifies data that does not exist in the client 200 or needs to be obtained from the server 100.

The client 200 requests the server 100 to transmit specified data to be obtained. The HTTP server 130 that has received the request sends the request to the APP server 120. Then, the APP server 120 requests the DB server 110 to obtain and send the requested data. When obtaining the requested data, the DB sever 110 outputs the data to the APP server 120. Then, the APP server 120 outputs to the HTTP server 130 the data sent from the DB server 110 and the HTTP server 130 outputs the received data to the client 200. At this time, the client 200 stores the obtained data in the data storage 250.

On the other hand, when the data copy from the server 100 to the client 200 is finished in step S112, the history information processing is executed (step S116). The history information processing is processing of changing data held by the client 200 based on information of a history of changes of the data managed by the HTTP server 130 of the server 100. If the server 100 and the client 200 are synchronized at least once, the client 200 can hold the same data as that managed by the server 100 by obtaining a change type of the data obtained at the client 200. With this structure, the data synchronization processing can be performed at such a state that the server load is low.

In order to execute the history information processing, the server 100 stores a change of data executed at the server 100 per client 200 as change history information in the server history storage 136 of the HTTP server 130. The APP server processing unit 122 of the APP server 120 monitors a state of data based on the history storage conditions, outputs changed information to the HTTP server 130 per change and stores it as change history information in the server history storage 136.

In step S116, the client 200 first requests the server 100 to transmit a history information file containing the change history information. Receiving the request to transmit the history information file, the server 100 obtains the history information file of the subject client 200 from the server history storage 136 at the HTTP server 130 and transmits it to the client 200. As the history information file can be handled directly by the HTTP server 130, when the server 100 receives the request for obtaining the history information file from the client 200, this processing can be completed only by the HTTP server 130. This makes it possible for the server 100 to perform synchronization processing with less server load unless the number of history records to be managed is huge.

Once obtaining the history information file, the client 200 refers to the change history information to update the data currently held in the data storage 250 of the client 200. That is, the data obtaining unit 240 uses a data name of data contained in the change history information, change type and change time (last change time in the server 100) as a basis to update the data of the data storage 250 and performs synchronization with the data stored in the server 100.

When the state of the data managed in the server 100 is reflected in the client 200 through the processing of steps S114 and 116, then, the state of data stored in the client 200 is notified to the server 100 when necessary (step S118). When the data is changed by another client 200, it receives changed data from the server 100, while for the data updated by the client 200 itself, it is necessary to notify the server 100 of the changed data for synchronization with the other client 200. Then, the client 200 uses a transmission state flag of the client data information as a basis to transmit to the server 100 the data changed by the client 200 itself after obtaining the data from the server 100.

The transmission state flag is information for determining the data added or changed at the client 200 but not transmitted to the server 100. For example, the transmission state flag is "Post" for the data that is updated at the client 200 but not transmitted to the server 100 and "PostSuccess" for the data that is transmitted to the server 100 successfully. The transmission state flag for the other data is set to "Steady". The client 200 transmits the data with the transmission state flag "Post" to the server 100.

When the server 100 has received data changed at the client 200, the server 100 changes the data stored in the DB server 110 for synchronization with the state of data of the client 200. With this, the data stored in the server 100 is the same as that stored in the client 200. Further, another client 200 refers to the change history file of the server 100 to know update of the data of the server 100, and obtains the changed data from the server 100 for synchronization of the data.

Also recorded in the change history file of the client 200 that has transmitted the changed data is reflection of the self changed data in the data storage 112 of the server 100 as change history information. With this structure, when the client 200 obtains the change history file from the server 100 next, reflection of the data updated by itself in the server 100 side is recognized from the change history information. That is, when transmission of data with the transmission state flag of the client data information "Post" to the server 100 is succeeded, the transmission state flag of the data is set to "PostSuccess". Then, when the client 200 updates the data changed based the change history information obtained from the server 100, the client 200 checks the transmission state flag of the client data information. Then, if the transmission state flag is "PostSuccess", the data is self-changed data and does not need to be transmitted to the server 100. Therefore, when the transmission state flag of the data to be updated based on the change history information is "PostSuccess", the client 200 does not update the data held by the client 200 and changes setting of the transmission state flag of the data of the client data information from "PostSuccess" to "Steady". Later, if the data is further updated, the transmission state flag is set to "Post" again.

Here, if the changed content at the client 200 is reflected at the server 100 side, as described above, the changed data itself may be transmitted to the server 100 or a changed content of the data may be only transmitted to the server 100. When receiving the changed content, the server 100 uses the change content as a basis to change the data stored in the data storage 112 of the DB server 110 for synchronization of the data.

Here, out of changes of the data at the client 200, in data deletion, data on the server 100 may be deleted in accordance with change of the client 200 or the data may be held on the server 200. This is because, if the data is deleted from a certain client 200, the data may be also deleted from another client 200 that does not desire deletion of the data. When receiving a request to delete the data from the client 200, the server 100 transmits a message to the client 200 for confirming whether the data may be deleted. Then, the server 100 may delete the data only when receiving the reply to permit deletion from the client 200. Alternatively, when the data on the server 100 is not deleted and the data is deleted at the client 200 side, the deleted data may be transmitted from the server 100 to the client 200 automatically or upon request from the client 200.

In this manner, through the processing of steps S114 to S118, data can be synchronized between the server 100 and the clients 200. After the processing of step S118 is finished, it is checked whether the flow goes back to S100 and the data synchronization processing is repeated.

Up to this point, the data synchronization processing when there is no overflow has been described. When there is no overflow, only the data changed based on change history information is basically updated. On the other hand, when the change history information becomes huge, the history information file stored in the server 100 may consume a significant amount of memory. Then, the time taken for the history information processing exceeds the time taken for copying of data managed at the sever 100 to the client 200. Then, the data synchronization processing according to the embodiment allows reduction of the load on the server 100 and the synchronization time. The following explanation is made, with reference to FIG. 5, about data synchronization processing when there is an overflow.

(3-2. Data Synchronization Processing in the Case of Overflow)

The data synchronization processing when there is an overflow is performed following the flowchart of FIG. 5. Determination whether there is an overflow is made by the APP server processing unit 122 based on the number of overflow history records stored in the setting storage 124 of the APP server 120. The APP server processing unit 122 adds the change information as change history information to the history information file of the server history storage 136 every time data held in the DB server 110 is changed if the number of change history information pieces stored in the server history storage 136 of the HTTP server 130 is equal to or less than the number of overflow history records. Accordingly, the change history of data changed at the server 100 side before the client 200 accesses the server 100 can be recognized from the history information file.

However, when the client 200 does not access the server 100 for a long time or when there are plural clients 200 connected to the network 10 or a certain client 200 accesses the server 100 frequency, huge change history information is generated. When the client 200 uses such change history information as a basis to obtain the data one after another, copying of the data takes an enormous time. Further, the load of the server 100 storing the change history information also becomes huge.

Then, in such a case, the APP server processing unit 122 causes the history processing unit 134 to stop writing of change history information in the history information file of the server history storage 136 and records the overflow determination information indicating there is an overflow. When recognizing there is an overflow of the change history information in the server 100 from the overflow determination information, the client 200 obtains data presence information that is information relating to all data stored in the server 100 for synchronization of the data. The following description is made, with reference to FIG. 5, about the data synchronization processing when there is an overflow. Here, the processing in steps S200 to S208 is the same as the data synchronization processing of steps S100 to S108 in FIG. 4 when there is no overflow and detailed description of such processing is omitted below.

First, the client 200 checks if the finish conditions are met for finishing the data synchronization processing (S200). The client 200 determines whether the finish conditions are met (S202) and if yes, the data synchronization processing is finished. On the other hand, if the finish conditions are not met, it is checked whether setting of history storage conditions is finished (S204).

Then, the client 200 determines whether or not setting of the above-mentioned setting information is performed by the storage condition setting unit 220 (S206). If the setting information is not set, the client 200 performs setting of the setting information and outputs it as history storage conditions to the server 100 via the client communication unit 210 (S208). Then, after the history storage conditions are set at step S208, or when the history storage conditions are already set, the client 200 checks if the data managed by the server 100 is copied to the client 200 from the server 100 and also checks the state of the overflow flag (S210).

The overflow flag is set based on the overflow determination information contained in the history information file stored in the server history storage 136 of the HTTP server 130. In this embodiment, if it is confirmed that the number of history records managed by the history information file of the overflow determination information does not exceed the number of overflow history records, the overflow flag is set to "false". If it is confirmed that the number of history records managed by the history information file of the overflow determination information exceeds the number of overflow history records, the overflow flag is set to "true".

The client 200 determines from the check processing in S210 whether or not data copying is finished and the overflow flag is "false" (step S212). Then, if at least one of finish of data copying and the overflow flag of "false" is not met, the client 200 performs copying of data managed by the server 100 (step S214; data copying processing). The processing of step S214 can be performed in the same way as that of step S114 of FIG. 4.

Here, the processing of copying data in step S114 of FIG. 4 and step S214 of FIG. 5 sometimes needs to be divided in accordance with the number of data pieces to process and contents. For example, if the time taken for one loop is long due to copying of all the data at once, the processing of copying is divided preferably.

Besides, when there is an overflow at the server 100 side, the last change time at the server 100 of each data piece is stored at the client 200 side thereby to eliminate the need to obtain again the already stored data from the server 100. This structure contributes to reduction of time taken for the data synchronization processing. Further, if there is data deletion at the server 100 side after there is an overflow until the data synchronization processing is restarted, the deleted data can be specified by comparing information of data present in the server 100 with the data present in the client 200.

More specifically, the processing of obtaining only data that is determined necessary in the data copying processing may be executed, for example, by the method illustrated in FIGS. 6 to 10. First, the processing of obtaining updated or added data is performed following the flowchart shown in FIG. 6. First, the data obtaining unit 240 of the client 200 compares the data presence information obtained from the server 100 with the client data information managed at the client 200 to determine presence or absence of updated data (step S300). The data obtaining unit 240 compares the last change time of the data presence information and the last change time at the server 100 of the client data information, and when the last change time of the data presence information is new, it is determined that the data change is performed at the server 100 side.

If it is determined in S300 that there is updated data, the data obtaining unit 240 determines to obtain the data from the server 100 (step S302). On the other hand, when the last change time of the data presence information and the last change time at the server 100 of the client data information are the same, the data obtaining unit 240 acts to obtain the data.

For example, it is assumed that the information illustrated in FIG. 7 is a part of client data information at the client 200 and information illustrated in the left side table of FIG. 8 is data presence information managed at the server 100. The data obtaining unit 240 compares the data name and last change time between the data presence information and the client data information to determine whether the change time is updated at the server 100 side. In the examples of FIGS. 7 and 8, the data with the data name "222.jpg" is seen updated at the server 100 side. With this structure, the data obtaining unit 240 determines to obtain the data "222.jpg" from the server 100.

Then, the data obtaining unit 240 compares the last change time of the data presence information obtained from the server 100 with the client data information of the client 200 to determine presence or absence of newly added data at the server 100 (step S304). The data obtaining unit 240 compares the data name of the data presence information and that of the client data information to check if the data contained in the data presence information of the server 100 is contained in the client data information of the client 200. Then, if there is a data name of which data is only contained in the data presence information, the data obtaining unit 240 determines that the data is newly added to the server 100 and determines to obtain it from the server 100 (S306). On the other hand, if there is no data name of which data is only contained in the data presence information, the data obtaining unit 240 does not obtain data from the server 100.

For example, as seen in the examples of FIGS. 7 and 8, the data with the data name "444.jpg" is contained only in the data presence information. Then, the data obtaining unit 240 determines to obtain the data "444.jpg" from the server 100. In this way, the data updated or added at the server 100 side can be obtained at the client 200 side.

Here, it is difficult to specify, only from the information illustrated in FIGS. 7 and 8, the data deleted at the server 100 side while there is an overflow at the server 100 side. Then, for example, the client data information may contain a presence check flag that is information indicating presence or absence in the server 100 of data stored at the client 200 side. In this embodiment, when the presence of the same data in the server 100 is confirmed, the presence check flag is "true" and when the presence of the same data in the server 100 is unable to recognize, the presence check flag is "false". Therefore, the data with the presence check flag "false" is data that does not exist in the server 100 and can be determined to be deleted while there is an overflow.

Incorporation of the data deleted at the server 100 side into the client 200 side can be performed following the flowchart illustrated in FIG. 9. First, when the data obtaining processing 240 recognizes occurrence of an overflow of the change history information at the server 100 by the overflow flag, the presence check flags of client data information of the client 200 are all set to "false" (step S310). Then, the presence check flag may be added to the client data information as a management parameter or may be set in advance as a management parameter.

Then, the data obtaining unit 240 obtains the data presence information from the server 100 (step S311). Then, the data obtaining unit 240 checks if the data of the data presence information exists in the client data information of the client 200 (step S312). When the data of the same data name exists, the data obtaining unit 240 changes the presence check flag of the client data information from "false" to "true" (step S313). On the other hand, where there is no data with the same data name, the data obtaining unit 240 keeps the presence check flag of the client data information "false" unchanged (step S314).

The processing of steps S312 to 314 is repeated until check is completed for all data of data presence information pieces of the server 100 (step S315). When presence check is performed for all of the data pieces, the data obtaining unit 240 specifies the data with the presence check flag "false" from the client data information and delete the data from the data storage 250 (step S316).

For example, in the examples of FIGS. 7 and 8, the data presence is checked following the processing of FIG. 9, and then, it is found that there is no data with the data name "666.jpg" contained in the data presence information of the server 100. Accordingly, the data obtaining unit 240 deletes the data "666.jpg" from the data storage 250. In this way, it is possible to incorporate information of data deleted at the server 100 side during occurrence of an overflow into the client 200 side.

Returning to FIG. 5, when the data copying processing of step S214 is finished, the client 200 sets the overflow flag "false" (step S216). Meanwhile, in step S212, if data copying is finished and the overflow flag is determined to be "false", the client 200 executes the history information processing (step S218). The history information processing is performed in the same way as the processing of step S116 of FIG. 4. The client 200 compares the change history information of a history information file obtained from the server 100 with the client data information of the client 200 and obtains only changed data from the server 100 to record it in the data storage 250.

Here, the client 200 determines in step S218 whether there is an overflow of change history information at the server 100 (step S220). In step S220, the processing is performed such that information is generated for determining whether there is an overflow in the next loop of the data synchronization processing. When it is determined that there is an overflow, the client 200 sets the overflow flag "true" (step S222), and when it is determined that there is no overflow, it sets the overflow flag "false" (step S224).

Then, the client 200 notifies the server 100 of the state of data stored in the client 200 itself when necessary (step S226). The processing of step S226 may be performed in the same way as the processing of step S118 of FIG. 4. The client 200 uses the transmission state flag of the client data information as a basis to transmit to the server 100 data that is changed at the client 200 but not transmitted to the server 100. Upon receiving the data changed at the client 200, the server 100 changes the data stored in the DB server 110 for synchronization with the data in the client 200. With this synchronization, the data stored in the server 100 and the data stored in the client 200 become the same. Besides, another client 200 refers to the change history file of the server 100 thereby to recognize that the data of the server 100 is updated, and obtains the changed data from the server 100 for synchronization of the data.

Up to this point, the data synchronization processing when there is an overflow in the server 100 has been described. In this way, when the change history information of data managed at the server 100 exceeds the number of overflow history records, recording of the change history information at the server 100 is stopped and information indicating the presence of the overflow is set in the overflow determination information of the history information file. In this case, the client 200 performs the data copying processing of copying the data from the server 100 for synchronization of the data. Then, when data synchronization is finished between the server 100 and the client 200, information indicating absence of overflow is set in the overflow determination information of the history information file. With this setting, data synchronization is performed between the server 100 and the client 200 with the history information processing based on the change history information before there occurs a next overflow of the change history information. Then, it becomes possible to prevent increase of server load due to enormous amount of change history information accumulated at the server 100 and to reduce the time taken for the data synchronization processing.

[4. Effective Processing Method of Information of History of Changes]

Figures 11, 12:
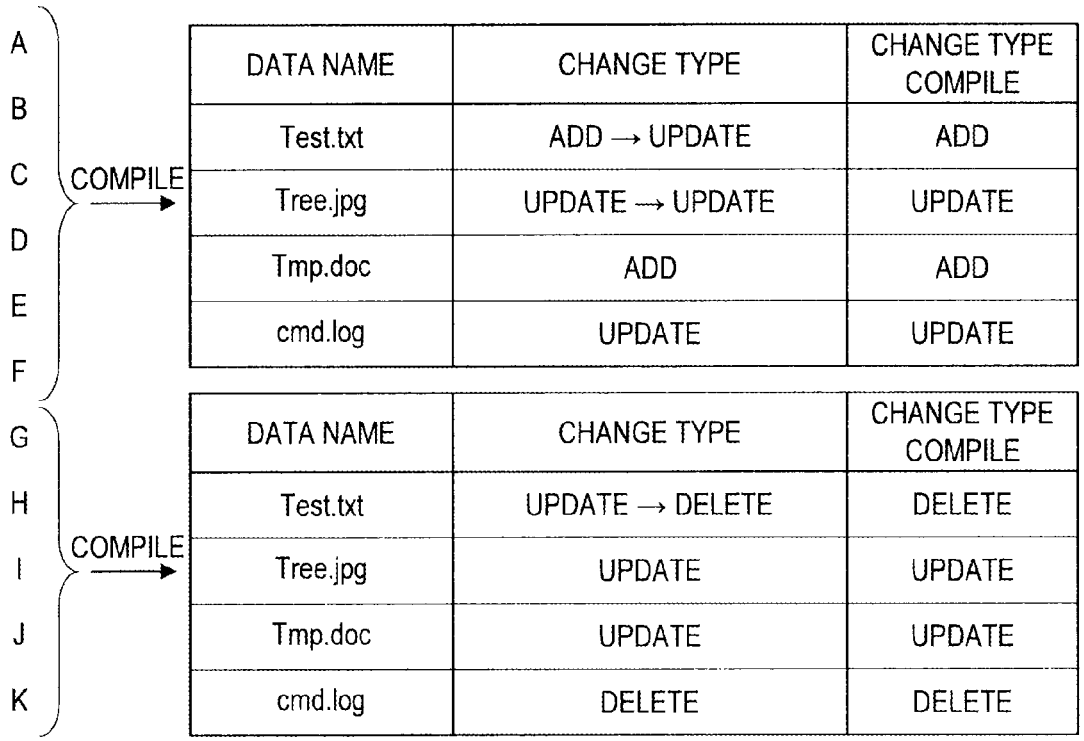
FIG. 11 is an explanatory view illustrating an example of compiling of information of a history of changes.
FIG. 12 is an explanatory view illustrating an example of division and compiling of the information of the history of changes.

Here, the change history information may be compiled to reduce the time taken for the data synchronization processing. The effective processing method of change history information will be described below with reference to FIGS. 11 to 12. Here, FIG. 11 is an explanatory view illustrating an example of compiled change history information. FIG. 12 is an explanatory view illustrating an example of division and compiling of the change history information.

(4-1. Compiling of Information of History of Changes)

The change history information is information showing change contents performed on the data and arranged in chronological order as illustrated in FIG. 3. For example, it is assumed that the server history storage 136 stores change information pieces A to K illustrated in FIG. 3 as change history information. Typically, the data pieces of the server 100 are incorporated into the client 200 in chronological order of change time to synchronize the data normally. Here, when plural changes are made to the same data, the processing is arranged in data units thereby to be able to reduce the number of data synchronization processing.

For example, four changes of change information pieces A, E, I and K are made to the data "Test.txt". The data obtaining unit 240 of the client 200 compiles these change information pieces as illustrated in FIG. 11. In this example, as the data "Test.txt" is newly added, updated twice and then, deleted, the data is consequently regarded as not existing from the beginning. Then, the data obtaining unit 240 determines not to obtain the data "Test.txt" from the server 100.

Likewise, three change processes of change information pieces B, F and J are performed on the data "Tree.jpg". In this example, as the data "Tree.jpg" existing in the server 100 is updated three times, the data obtaining unit 240 incorporates only the last change of the data "Tree.jpg" (change information piece J) into the data of the client 200. In addition, two change processes of change information pieces C and G are performed on the data "Tmp.doc". In this example, as the data "Tmp.doc" is newly added and updated, the data obtaining unit 240 adds updated (change information piece G) data "Tree.jpg" to the data storage 250 of the client 200.

Then, two change processes of change information pieces D and H are performed on the data "cmd.log". In this example, as the data "cmd.log" already existing in the server 100 is updated and deleted, the data obtaining unit 240 deletes the data "cmd.log" from the data storage 250 of the client 200. Thus, the processing of change history information of FIG. 3 is consequently compiled into three processes as illustrated in FIG. 11. This makes it possible to reduce the time of the data copying processing and drastically shorten the time of the data synchronization processing.

(4-2. Division of Information of History of Changes)

In the data copying processing, as described above, as the number of data pieces to be processed in one loop is restricted, the time taken for one data copying is reduced to an appropriate time thereby to realize smooth data synchronization processing. The same holds true for the change history information. However, the data copying is easily divided, and for example, if synchronization in file units is performed by division in file units, the processing can be performed normally without paying attention to the order of the processes or its dividing method. On the other hand, as to the change history information, the time when the change process is performed, that is, the order of processes is extremely important and if the processes are divided without consideration of the time, the proper synchronization is not performed. Therefore, it is necessary to divide the change history information pieces in accordance with the chronological order of the change processes. Division of change history information may be performed in accordance with the number of change history information pieces to process in one loop, that is, the number of history changes.

For example, division of change history information including history information pieces A to K as illustrated in FIG. 3 is considered. Then, the number of history processes in one loop is stored in advance in the setting storage 124 of the APP server 120. The number of history processes is set to be equal to or less than the number of overflow history records. For example, it is assumed that the number of overflow history records is 20, and the number of history processes in one loop is 6. Then, as illustrated in FIG. 3, as the number of history information is 11, there is no overflow and one loop is finished after the six history information pieces are processed. In the next loop, if the history information pieces are not increased, the remaining five history information pieces are processed.

That is, as illustrated in FIG. 12, at the first loop, six old history information pieces A to F are processed in chronological order of history information. In the next loop, the remaining five history information pieces G to K are processed. Then, as described above, two divided history information pieces may be compiled further.

For example, when the history information pieces A to F are compiled, two changes of change information pieces A and E are performed on the data "Test.txt". In such an example, as the new data "Test.txt" is newly added and updated, the data obtaining unit 240 adds the updated (change information piece E) data "Test.txt" to the data storage 250 of the client 200. Likewise, two change processes of change information pieces B and F are performed on the data "Tree.jpg". In this example, as the data "Tree.jpg" existing in the server 100 is updated twice, the data obtaining unit 240 reflects only the last change of the data "Tree.jpg" (change information piece F) on the data of the client 200.

As to the data "Tmp.doc" and "cmd.log", the data obtaining unit 240 incorporates the contents of history information pieces C and D in the data storage 250. Such compiling makes it possible to bring six history information pieces into four (upper-side table of FIG. 12) and to further reduce the processing of one loop. In the same way, when the history information pieces G to K are compiled, the five history information pieces are compiled into four (lower-side table of FIG. 12). In this way, the data synchronization processing can be executed properly even when the change history information is divided.

When the change history information is divided as shown in this example, finally eight processes are to be executed. As described based on FIG. 11, when compared with the case of batch compiling of the change history information, the number of processing becomes three to eight and is increased. However, the possibility of compiling of the change history information varies depending on the number and type of the data pieces. As the data synchronization processing is divided to be performed, as described above, it is possible to reduce the time taken for the processing of one loop surely to an appropriate time and to realize smooth synchronization.

In addition, for example, update processing of the data "Tree.jpg" and "Tmp.doc" in the lower table of FIG. 12 may be performed by the client 200 itself that perform the processing of change history information. As described above, the client 200 refers to the transmission state flag of the client data information to be able to confirm that it is a change type of data it requests the server 100 for. That is, when the transmission state flag is "PostSuccess", the data is determined to be the same as already stored data, and the processing of obtaining the data from the server 100 may be omitted. This makes it possible to further reduce the time taken for the synchronization processing.

The configuration of the data synchronization system according to the embodiment of the present invention and the data synchronization processing in the data synchronization system have been described above. According to the data synchronization system according to this embodiment, when there is an overflow of the number of history records at the server 100 side that manages the change history of the data, the server 100 does not hold the history and stores overflow determination information that indicates occurrence of an overflow. Then, when there is no overflow at the server 100, the client 200 performs the data synchronization processing based on the change history information and when there is an overflow, the data presence information is used as a basis to copy the latest data stored at the server 100 side.

With this structure, as the change history of data more than a predetermined number of data pieces is not accumulated at the server 100, it becomes possible to reduce the use amount of the memory by the server 100. Further, if the client 200 in which the data synchronization is not performed for a long time is connected to the network 10 and the data synchronization processing is restarted, the above-mentioned data synchronization processing is performed to achieve high-speed data synchronization. This brings about reduction of the communication traffic and reduction of the communication cost and saving of tight bandwidth.

It should be understood by those skilled in the art that various modifications, combinations, sub-combinations and alterations may occur depending on design requirements and other factors insofar as they are within the scope of the appended claims or the equivalents thereof.

For example, in the above-described embodiment, change of data at the side of the client 200 is notified to the server 100 after the change of data at the side of the server 100 is reflected on the data at the side of the client 200. However, this is not intended for limiting the invention. For example, the change of data at the side of the server 100 may be reflected on the data at the side of the client 200 after the change of data at the side of the client 200 is notified to the server 100.

The present application contains subject matter related to that disclosed in Japanese Priority Patent Application JP 2009-276947 filed in the Japan Patent Office on Dec. 4, 2009, the entire content of which is hereby incorporated by reference.

What is claimed is:

1. An information processing apparatus that is connected to a server for managing data via a network, the information processing apparatus comprising:
   a data storage configured to store the data obtained from the server;
   a check unit configured to check a cumulative state of change history information indicating a change type of data stored in the server, wherein the checking comprises determining whether a number of pieces of the change history information stored in the server exceeds a history number; and
   a data obtaining unit configured to select an obtaining method based on a check result of the checking performed by the check unit by:
      in a case where the number of pieces of the change history information stored in the server is equal to or less than the history number, selecting a first obtaining method of synchronizing the data stored in the data storage with the data managed by the server in accordance with the change history information; and
      in a case where the number of pieces of the change history information stored in the server exceeds the history number, selecting a second obtaining method of obtaining, from the server, data presence information indicating the data existing in the server to synchronize the data stored in the data storage and to obtain the data from the server.

2. The information processing apparatus according to claim 1,
   wherein the data storage stores client data information that is information relating to the data stored in the data storage, and
   when obtaining the data by the second obtaining method, the data obtaining unit compares the data presence information with the client data information and obtains from the server only data updated at the server.

3. The information processing apparatus according to claim 2,
   wherein when obtaining the data by the second obtaining method, the data obtaining unit compares the data presence information with the client data information to specify data that exists only in the information processing apparatus, and deletes the data that exists only in the information processing apparatus from the data storage.

4. The information processing apparatus according to claim 2,
   wherein the data obtaining unit transmits to the server information for updating the data managed by the server in synchronization with data changed in the information processing apparatus based on transmission state information that indicates the data changed in the information processing apparatus and not transmitted to the server, and contained in the client data information.

5. The information processing apparatus according to claim 1,
   wherein the data obtaining unit compiles the change history information on a data basis and obtains the data from the server based on the change history information compiled.

6. The information processing apparatus according to claim 1,
   wherein the data obtaining unit divides the change history information arranged in chronological order, into a predetermined number of data pieces and obtains the data from the server per divided piece of the change history information.

7. An information processing method comprising:
   checking a cumulative state of change history information that is stored in a server connected via a network for managing data and indicates a change type of the data in the server, wherein the checking comprises determining whether a number of pieces of the change history information stored in the server exceeds a history number;
   in a case where the number of pieces of the change history information stored in the server is equal to or less than the history number, selecting a first obtaining method of synchronizing the data stored in a data storage for storing the data obtained from the server with the data managed by the server in accordance with the change history information; and
   in a case where the number of pieces of the change history information stored in the server exceeds the history number, selecting a second obtaining method of obtaining, from the server, data presence information indicating the data existing in the server to synchronize the data stored in the data storage; and obtaining the data from the server by the selected obtaining method.

8. A data management server comprising:
a data storage configured to store data;
a data change unit configured to change the data stored in the data storage based on change information;
a server history storage configured to store change history information indicating a change type of the data changed by the data change unit;
a setting storage configured to store a threshold for a cumulative amount of the change history information stored in the server history storage;
a managing unit configured to manage a cumulative amount of the change history information stored in the server history storage based on the threshold;
an information processing unit configured to, upon a request from a client connected via a network:
  obtain the change history information in a case where the cumulative amount of the change history information stored in the server history storage is equal to or less than the threshold;
  obtain the data to transmit to the client in a case where the cumulative amount of the change history information stored in the server history storage exceeds the threshold; and
  create data presence information indicating the data existing in the data storage based on the data stored in the data storage; and
a server communication unit configured to transmit to the client the data presence information created, the change history information or the data obtained by the information processing unit.

9. The data management server according to claim 8, wherein the managing unit stops accumulation of the change history information when the cumulative amount of the change history information stored in the server history storage exceeds the threshold.

10. The data management server according to claim 9, wherein when the cumulative amount of the change history information stored in the server history storage exceeds the threshold, the managing unit records, in the data history storage, overflow determination information indicating that the cumulative amount of the change history information exceeds the threshold.

11. The data management server according to claim 8, wherein the information processing unit includes a first processing unit for obtaining the data from the data storage and creating the server presence information and a second processing unit for obtaining the change history information from the server history storage, and
when receiving a transmission request of the change history information from the client, the server communication unit causes the second processing unit to obtain the change history information from the server history storage.

12. The data management server according to claim 8, wherein the server history storage stores the change history information per client connected via the network.

13. An information processing method comprising:
changing data stored in a data storage for storing the data, based on change information;
storing in a server history storage change history information indicating a change type of the data changed;
managing a cumulative amount of the change history information stored in the server history storage based on a threshold for a cumulative amount of the change history information stored in the server history storage;
upon a request from a client connected via a network:
  in a case where the cumulative amount of the change history information stored in the server history storage exceeds the threshold, obtaining the data; and
  in a case where the cumulative amount of the change history information stored in the server history storage is equal to or less than the threshold, obtaining the change history information to transmit to the client;
upon a request from the client, creating data presence information indicating the data existing in the data storage based on the data stored in the data storage; and
transmitting the data obtained, the change history information or the data presence information created to the client.

14. A data synchronization system for synchronization of data between a client and a server connected via a network, wherein:
the server comprises:
  a data storage configured to store the data;
  a data change unit configured to change the data stored in the data storage based on change information;
  a server history storage configured to store change history information indicating a change type of the data changed by the data change unit;
  a setting storage configured to store a threshold for a cumulative amount of the change history information stored in the server history storage;
  a managing unit configured to manage a cumulative amount of the change history information stored in the server history storage based on the threshold;
  an information processing unit configured to, upon a request from the client connected via the network, selectively obtain the change history information or the data to transmit to the client, based on whether the cumulative amount of the change history information stored in the server history storage exceeds the threshold, and create data presence information indicating the data existing in the data storage based on the data stored in the data storage; and
  a server communication unit configured to transmit to the client the data presence information created, the change history information or the data obtained by the information processing unit; and
the client comprises:
  a client communication unit configured to receive the data, the change history information and the data presence information from the server;
  a data storage configured to store the data obtained from the server;
  a check unit configured to check a cumulative state of the change history information stored in the server, wherein the checking comprises determining whether a number of pieces of the change history information stored in the server exceeds a history number; and
  a data obtaining unit configured to select an obtaining method based on a check result of the checking performed by the check unit by:
    in a case where the number of pieces of the change history information stored in the server is equal to or less than the history number, selecting a first obtaining method of synchronizing the data stored in the data storage with the data managed by the server in accordance with the change history information; and in a case where the number of pieces of the change history information stored in the server exceeds the history number, selecting a second obtaining method of obtaining, from the server, data presence information indicating the data existing in the server to synchronize the data stored in the data storage, and to obtain the data from the server.

* * * * *